United States Patent
Wurzer

(10) Patent No.: US 9,073,451 B1
(45) Date of Patent: Jul. 7, 2015

(54) TRUCK SEAT ADAPTER

(71) Applicant: Adam J. Wurzer, Carroll, IA (US)

(72) Inventor: Adam J. Wurzer, Carroll, IA (US)

( * ) Notice: Subject to any disclaimer, the term of this patent is extended or adjusted under 35 U.S.C. 154(b) by 0 days.

(21) Appl. No.: 14/274,821

(22) Filed: May 12, 2014

(51) Int. Cl.
*B65D 19/00* (2006.01)
*B60N 2/015* (2006.01)
*A47B 97/00* (2006.01)
*F16M 11/00* (2006.01)

(52) U.S. Cl.
CPC ............... *B60N 2/015* (2013.01); *A47B 97/00* (2013.01); *F16M 11/00* (2013.01)

(58) Field of Classification Search
CPC ...... B65D 19/0002; B60N 2/50; B60N 2/502; F16M 5/00; F16M 13/00; F16M 11/00; F16M 11/2092; F24F 13/32; B41J 29/04; A47B 97/00
USPC ............... 248/346.01, 429, 678, 680, 346.03, 248/188.1; 296/65.02, 65.03, 65.11, 65.13; 297/344.1; 108/56.1, 902
See application file for complete search history.

(56) References Cited

U.S. PATENT DOCUMENTS

| | | | |
|---|---|---|---|
| 3,652,044 A * | 3/1972 | Manross | 248/657 |
| 4,243,195 A | 1/1981 | Rosenberg | |
| 5,326,067 A * | 7/1994 | Gonzalez | 248/503.1 |
| 5,496,088 A * | 3/1996 | Stewart | 296/65.03 |
| 5,505,141 A * | 4/1996 | Barber | 108/57.26 |
| 5,579,686 A * | 12/1996 | Pigott et al. | 108/56.1 |
| RE38,845 E * | 10/2005 | Odagaki | 296/65.11 |
| 7,028,970 B1 * | 4/2006 | Wiseman | 248/669 |
| 7,966,949 B2 * | 6/2011 | Willey | 108/44 |
| 8,172,195 B2 * | 5/2012 | Fanucci et al. | 248/647 |
| 8,282,149 B2 * | 10/2012 | Kniffin et al. | 296/65.02 |
| 2005/0072897 A1 * | 4/2005 | Fanucci et al. | 248/647 |
| 2014/0311068 A1 * | 10/2014 | Takagi et al. | 52/295 |

* cited by examiner

*Primary Examiner* — Anita M King
(74) *Attorney, Agent, or Firm* — Dennis L. Thomte; Thomte Patent Law Office LLC

(57) ABSTRACT

A truck seat adapter which is designed to be positioned between the floor of the driver's compartment and the seat base of a truck to enable the seat to be positioned rearwardly of the factory installed position to provide additional leg room for the driver.

4 Claims, 4 Drawing Sheets

TRUCK SEAT ADAPTER

BACKGROUND OF THE INVENTION

1. Field of the Invention

This invention relates to a truck seat adapter and more particularly to a truck seat adapter which enables a truck seat to be moved rearwardly from the factory installed position to provide additional leg room for the driver of the truck.

2. Description of the Related Art

A conventional truck seat includes a seat base which is fixedly secured to the floor of the driver's cab or compartment by four bolts which extend downwardly from the seat base through the floor of the driver's compartment. The seat portion of the truck seat is slidably moved forwardly or rearwardly on the seat base. However, the seat portion is limited in its rearward movement by the seat base being secured in a fixed position to the floor of the driver's compartment. In many cases, the driver does not have sufficient leg room even if the seat is in its rearwardmost position with respect to the seat base.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An adapter plate is disclosed for use with a vehicle such as a truck including a floor in the driver's compartment with the floor having first, second, third and fourth bolt openings extending downwardly therethrough with the bolt openings normally receiving bolts extending therethrough to secure the seat base of a seat to the floor. The adapter of this invention includes a generally rectangular, flat adapter plate having a forward end, a rearward end, a first side, a second side, an upper surface and a lower surface. The adapter plate has a first bolt opening formed therein rearwardly of the forward end thereof and which is positioned inwardly of the first side thereof. The adapter plate also has a second bolt opening formed therein rearwardly of the first bolt opening. The adapter plate also has a third bolt opening formed therein rearwardly of the forward end thereof and which is positioned inwardly of the second side thereof. The adapter plate also has a fourth bolt opening formed therein which is spaced rearwardly of the third bolt opening in the adapter plate. The first, second, third and fourth bolt openings in the adapter plate are configured to register with the first, second, third and fourth bolt openings in the floor respectively. Bolts extend downwardly through the bolt openings in the adapter plate and downwardly through the bolt openings in the floor with nuts being secured to the lower ends of the bolts below the floor.

The adapter plate has a first set of spaced-apart adjustment openings, having internal threads, formed therein which are positioned rearwardly of the first bolt opening of the adapter plate. The adapter plate also has a second set of spaced-apart adjustment openings, having internal threads, formed therein which are positioned rearwardly of the second bolt opening of the adapter plate. The adapter plate also has a third set of spaced-apart adjustment openings, having internal threads, formed therein which are positioned rearwardly of the third bolt opening of the adapter plate. The adapter plate has a fourth set of spaced-apart adjustment openings, having internal threads, formed therein which are positioned rearwardly of the fourth bolt opening of the adapter plate.

The individual bolt openings of the first, second, third and fourth sets of adjustment openings and configured to selectively and threadably receive bolts extending downwardly from the seat base to enable the seat base and seat to be selectively adjustably rearwardly positioned with respect to the first, second, third and fourth bolt openings in the floor to increase the leg room for a driver.

It is therefore a principal object of this invention to provide an adapter plate for a truck seat.

A further object of the invention is to provide an adapter plate which may be used in combination with a truck seat to enable the truck seat to be moved rearwardly beyond its normal rearward position to increase the leg room for the driver.

A further object of the invention is to provide an invention of the type described which is easily retrofitted onto the floor of a truck cab between the floor of the cab and the seat base of a seat.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
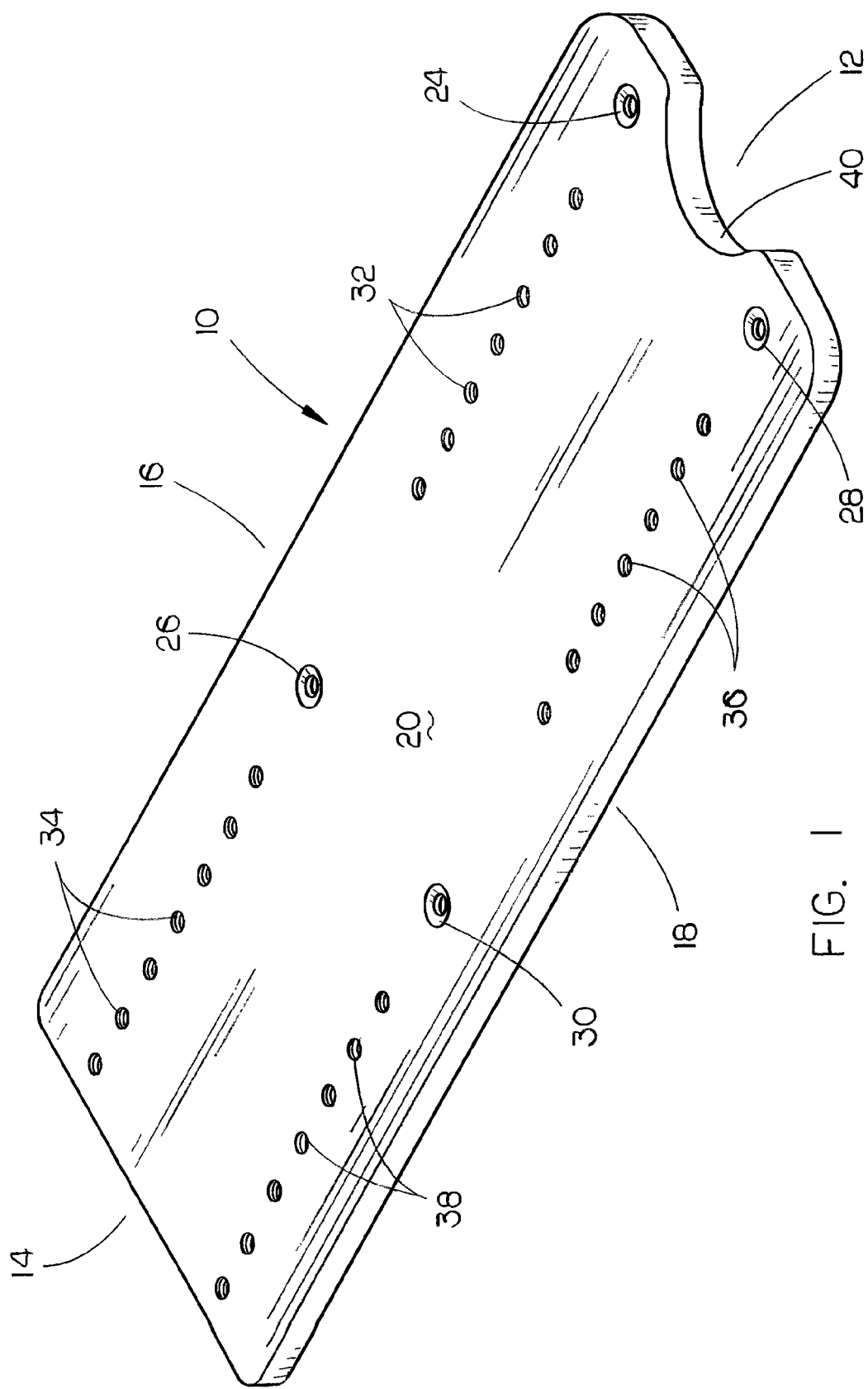
FIG. 1 is a perspective view of the adapter plate of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The adapter plate of this invention is designated by the reference numeral 10 and is comprised of a metal material. Adapter plate 10 is flat and is generally rectangular in configuration. Adapter plate 10 includes a forward end 12, rearward end 14, a first side 16, a second side 18, an upper side 20 and a lower side 22. Adapter plate 10 has a chamfered bolt opening 24 formed therein rearwardly of the forward end 12 which is spaced inwardly of side 16. Adapter plate 10 also has a chamfered bolt opening 26 formed therein rearwardly of bolt opening 24. Adapter plate 10 also has a chamfered bolt opening 28 formed therein rearwardly of the forward end 12 which is spaced inwardly of side 18. Adapter plate 10 also has a chamfered bolt opening 30 formed therein rearwardly of the bolt opening 28.

Adapter plate 10 has a first set of internally threaded or tapped bolt openings 32 which are positioned rearwardly of bolt opening 24. Preferably, the openings 32 are spaced one-inch apart. Adapter plate 10 also has a second set of internally threaded or tapped bolt openings 34 which are positioned rearwardly of bolt opening 26. Adapter plate 10 also has a third set of internally threaded or tapped bolt openings 36 formed therein which are positioned rearwardly of bolt opening 28. Adapter plate 10 also has a fourth set of internally threaded or tapped bolt openings 38 formed therein which are positioned rearwardly of bolt opening 30. Preferably, the openings 32 are spaced one-inch apart as are bolt openings 34, 36 and 38. Preferably, the forward end 12 of adapter plate 10 has a semi-circular recess 40 formed therein. Preferably, the corners of adapter plate 10 are rounded as seen in FIG. 1.

Figure 2:
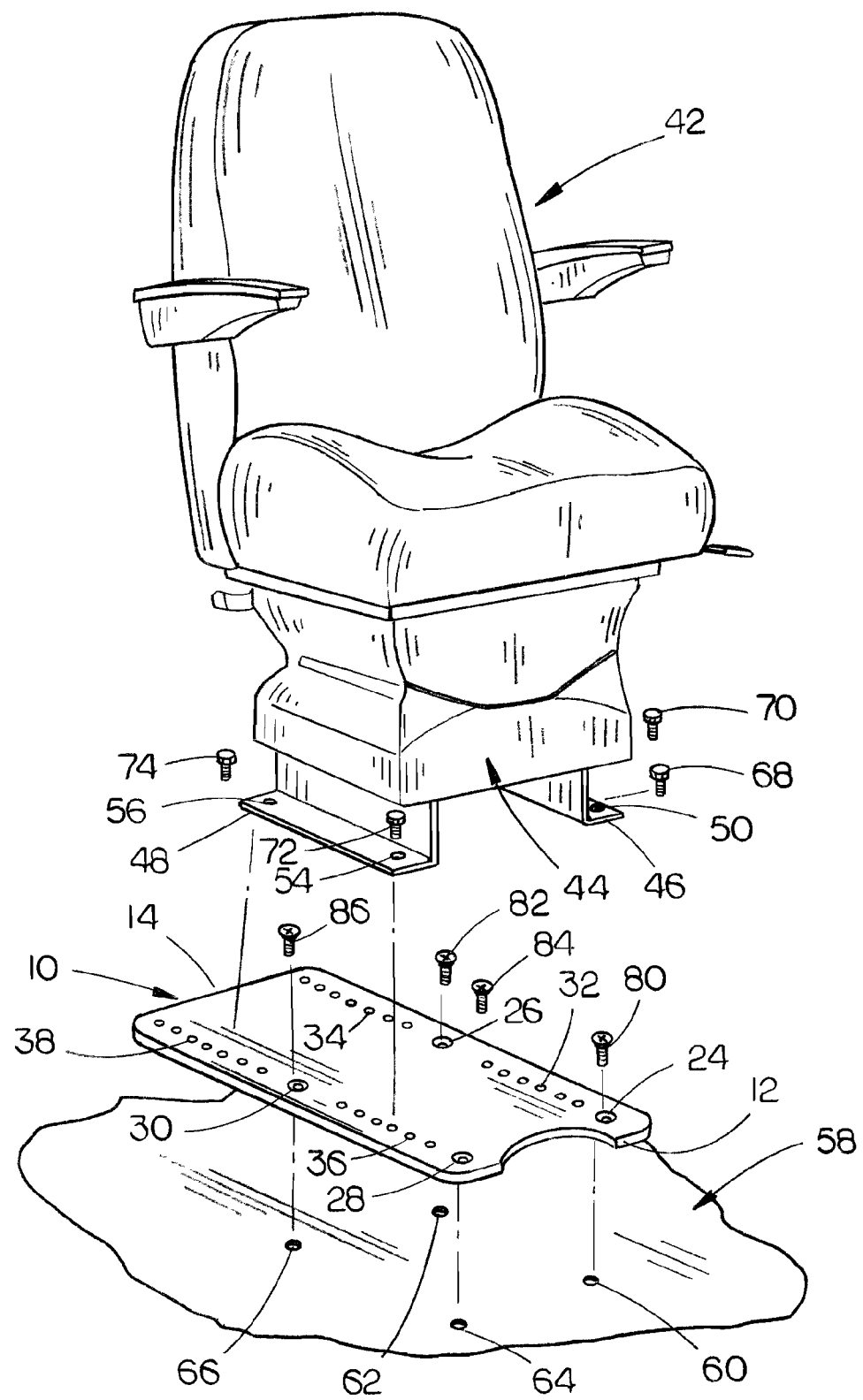
FIG. 2 is an exploded perspective view illustrating the manner in which the adapter plate of this invention is imposed between the floor of a truck cab and a seat in the truck cab.
Figure 3:
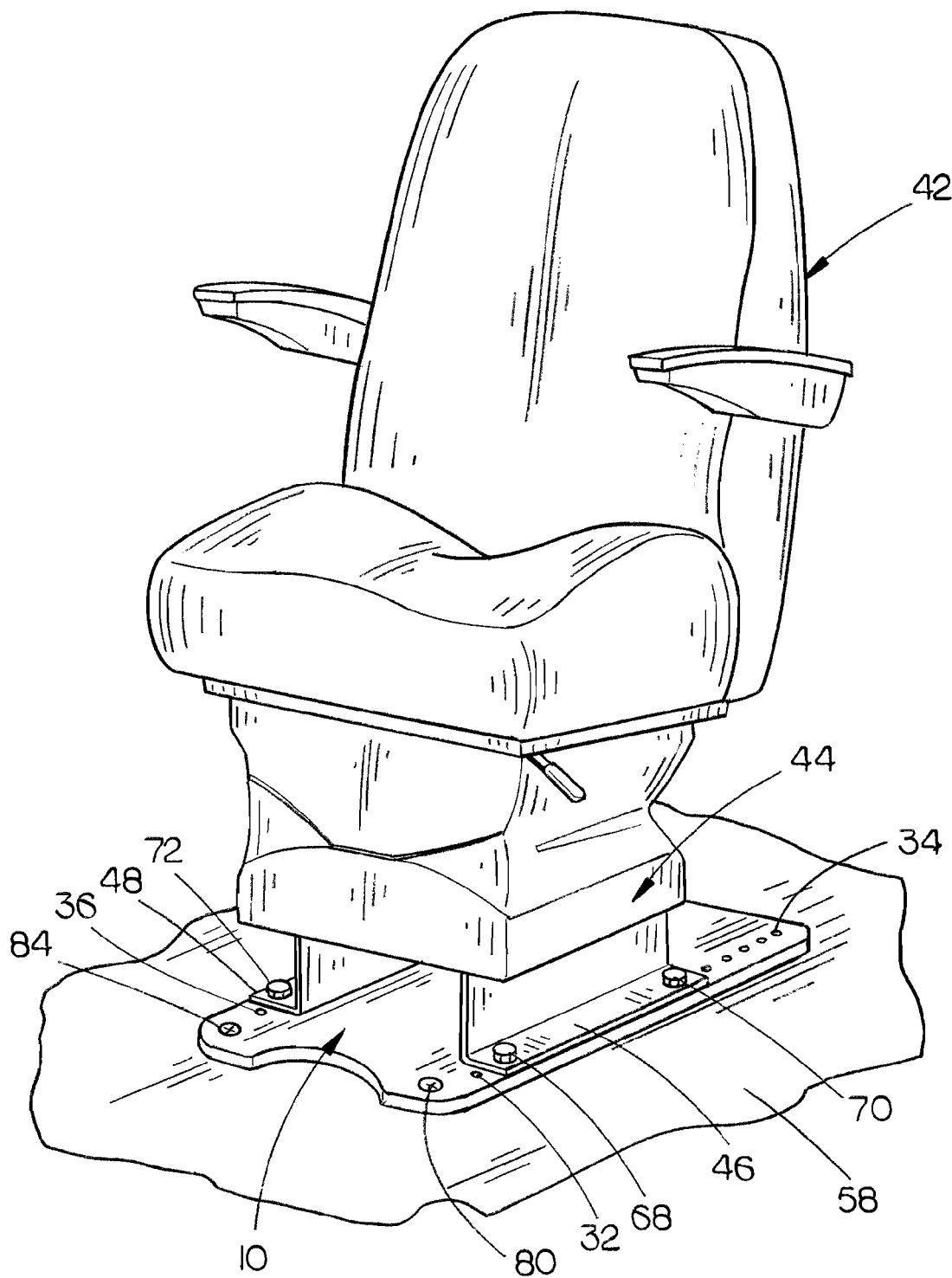
FIG. 3 is a perspective view illustrating the adapter plate positioned between a truck cab floor and a seat in the cab of the vehicle.
Figure 4:
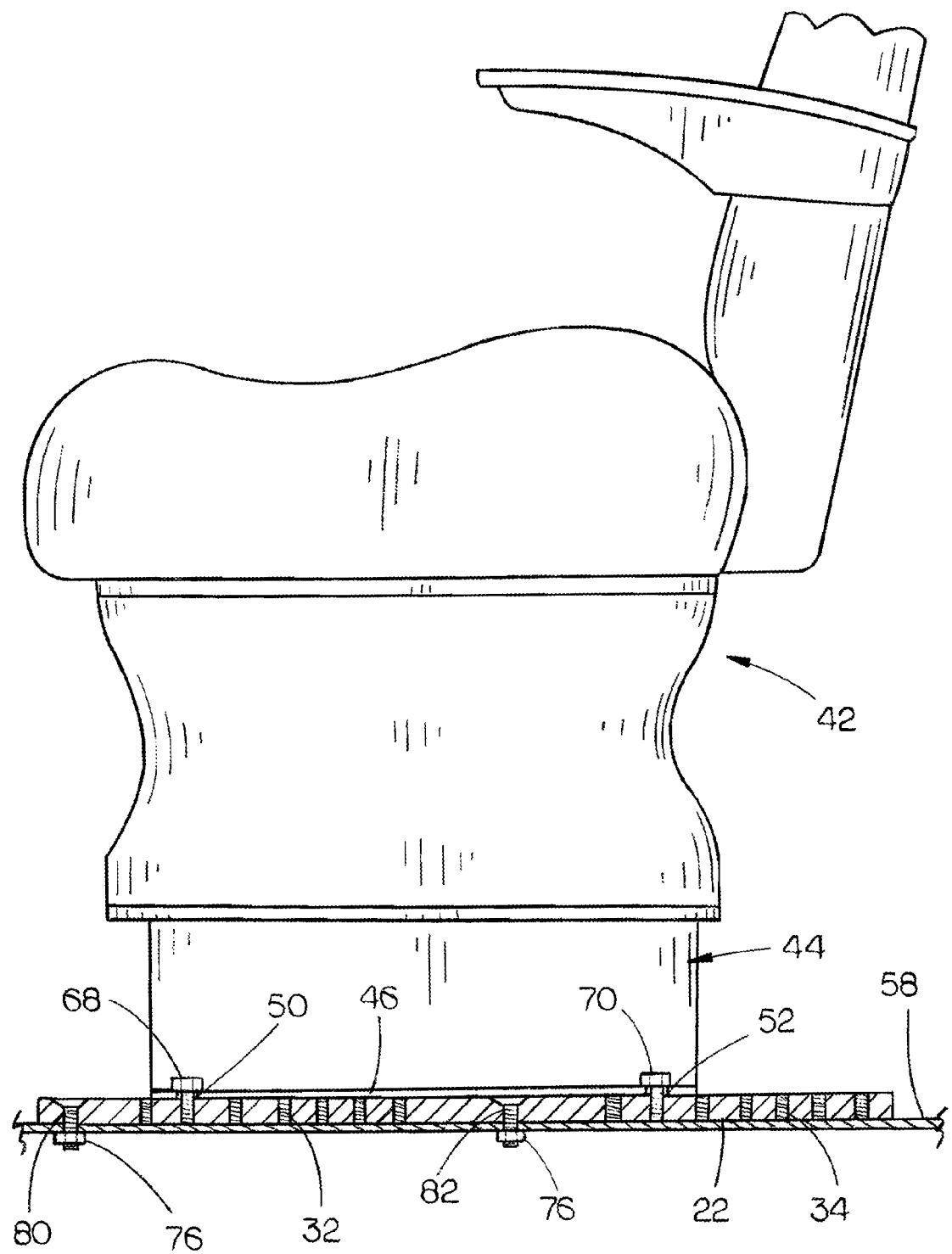
FIG. 4 is a partial sectional view illustrating the adapter plate of this invention positioned between the seat and the floor of a vehicle such as a truck.

The adapter plate 10 of this invention is designed to be used with a conventional truck seat 42 which includes a seat base 44 having mounting brackets or flanges 46 and 48 at the lower end thereof. Bracket 46 has spaced apart bolt openings 50 and 52 formed therein. Bracket 48 has spaced-apart bolt openings 54 and 56 formed therein. Seat 42 is normally secured to floor 58 of the driver's cab or compartment. Floor 58 has spaced-apart bolt openings 60, 62, 64 and 66 formed therein as seen in FIG. 2. Seat 42 is normally secured to floor 58 by bolts 68, 70, 72 and 74 extending downwardly through bolt openings 50, 52, 54 and 56 respectively and downwardly through bolt openings 60, 62, 64 and 66 in floor 58 respectively. Four nuts 76 are usually welded to the underside of the floor 58 beneath bolt openings 60, 62, 64 and 66 which normally threadably receive the lower ends of bolts 68, 70, 72 and 74 to secure the seat 42 to floor 58.

Although the prior art seats 42 include some form of slidable adjustment of the seat 42 rearwardly or forwardly with respect to floor 58, that adjustment is limited by the brackets 46 and 48 being secured to the floor. Thus, the adapter plate 10 is provided as will be explained in detail hereinafter.

First, the bolts 68, 70, 72 and 74 are threadably disconnected from the nuts 76. The seat 42 is then raised upwardly from floor 58 and temporarily moved to one side. Adapter plate 10 is then placed on floor 58 so that bolt openings 24, 26, 28 and 30 in adapter plate 10 register with bolt openings 60, 62, 64 and 66 respectively in floor 58. Bolts 80, 82, 84 and 86 are then inserted downwardly through bolt openings 24, 26, 28 and 30 respectively in adapter plate 10 and downwardly through bolt openings 60, 62, 64 and 66 respectively in floor 58 and threadably secured to the nuts 76.

The seat 42 is then placed upon the adapter plate 10 so that the bolt openings 50 and 54 register with the selected bolt openings in the first set of bolt openings 32 and the third set of bolt openings 36 in adapter plate 10. At that time, the bolt openings 52 and 56 in brackets 46 and 48 will register with corresponding bolt openings in the second and fourth sets of bolt openings 34 and 38. The positioning of the seat base 44 on the adapter plate 10 will depend upon the driver's choice. If the driver desires for the greatest amount of leg room possible, the bolt openings 50, 52 and 54, 56 will be positioned over the rearwardmost bolt openings in the first, second, third and fourth sets of bolt openings respectively. Bolts 68, 70, 72 and 74 will then be extended downwardly through bolt openings 50, 52, 54 and 56 respectively and threadably secured to the internally threaded bolt openings in the first, second, third and fourth sets of bolt openings. If the bolts 68, 70, 72 and 74 are too long or too short, different bolts will be utilized.

Thus it can be seen that an adapter plate has been provided which enables a truck seat to be moved rearwardly of its normal rearwardmost position to provide additional and proper leg room for the driver of the truck.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination with a vehicle including a floor in a driver's compartment with the floor having first, second, third and fourth bolt openings extending downwardly therethrough with the bolt openings normally receiving bolts extending therethrough to secure a seat base of a seat to the floor, comprising:

a generally rectangular, flat adapter plate having a forward end, a rearward end, a first side, a second side, an upper surface and a lower surface;

said adapter plate having a first bolt opening formed therein rearwardly of said forward end thereof and which is positioned inwardly of said first side thereof;

said adapter plate having a second bolt opening formed therein rearwardly of said first bolt opening in said adapter plate;

said adapter plate having a third bolt opening formed therein which is spaced rearwardly of said forward end of said adapter plate and which is positioned inwardly of said second side thereof;

said adapter plate having a fourth bolt opening formed therein which is spaced rearwardly of said third bolt opening in said adapter plate;

said first, second, third and fourth bolt openings in said adapter plate being configured to register with the first, second, third and fourth bolt openings in the floor respectively;

a first bolt extending downwardly through said first bolt opening in said adapter plate and downwardly through the first bolt opening in the floor;

a nut secured to said first bolt below the floor;

a second bolt extending downwardly through said second bolt opening in said adapter plate and downwardly through the second bolt opening in the floor;

a nut secured to said second bolt below the floor;

a third bolt extending downwardly through said third bolt opening in said adapter plate and downwardly through the third bolt opening in the floor;

a nut secured to said third bolt below the floor;

a fourth bolt extending downwardly through said fourth bolt opening in said adapter plate and downwardly through the fourth bolt opening in the floor;

a nut secured to said fourth bolt below the floor;

said adapter plate having a first set of spaced-apart adjustment openings, having internal threads, formed therein which are positioned rearwardly of said first bolt opening of said adapter plate;

said adapter plate having a second set of spaced-apart adjustment openings, having internal threads, formed therein which are positioned rearwardly of said second bolt opening of said adapter plate;

said adapter plate having a third set of spaced-apart adjustment openings, having internal threads, formed therein which are positioned rearwardly of said third bolt opening of said adapter plate;

said adapter plate having a fourth set of spaced-apart adjustment openings, having internal threads, formed therein which are positioned rearwardly of said fourth bolt opening of said adapter plate;

the individual bolt openings of said first, second, third and fourth sets of adjustment openings being configured to selectively and threadably receive bolts extending downwardly from the seat base to enable the seat base and seat to be selectively adjustably rearwardly positioned with respect to the first, second, third and fourth bolt openings in the floor to increase the leg room for a driver.

2. The combination of claim 1 wherein said first, second, third and fourth bolt openings in said adapter plate are chamfered openings.

3. The combination of claim 1 wherein said adapter plate has rounded corners.

4. The combination of claim 1 wherein said forward end of said adapter plate has a semi-circular recess formed therein.

* * * * *